(12) United States Patent
Dickson

(10) Patent No.: US 9,101,200 B2
(45) Date of Patent: Aug. 11, 2015

(54) WHEELED LUGGAGE ATTACHMENT DEVICE

(71) Applicant: David Dickson, Cumming, GA (US)

(72) Inventor: David Dickson, Cumming, GA (US)

( * ) Notice: Subject to any disclaimer, the term of this patent is extended or adjusted under 35 U.S.C. 154(b) by 98 days.

(21) Appl. No.: 13/930,892

(22) Filed: Jun. 28, 2013

(65) Prior Publication Data

US 2014/0008402 A1    Jan. 9, 2014

Related U.S. Application Data

(60) Provisional application No. 61/665,971, filed on Jun. 29, 2012.

(51) Int. Cl.
| | | |
|---|---|---|
| *A45F 5/00* | (2006.01) | |
| *A45F 5/02* | (2006.01) | |
| *F16M 13/04* | (2006.01) | |
| *F16M 11/20* | (2006.01) | |
| *A45C 5/14* | (2006.01) | |
| *A45C 13/38* | (2006.01) | |
| *A45F 3/14* | (2006.01) | |

(52) U.S. Cl.
CPC . *A45F 5/021* (2013.01); *A45F 5/00* (2013.01); *F16M 11/2078* (2013.01); *F16M 13/04* (2013.01); *A45C 5/14* (2013.01); *A45C 13/38* (2013.01); *A45F 2003/144* (2013.01)

(58) Field of Classification Search
CPC .......................... B62B 5/068; A63B 2055/082
USPC ............... 224/270, 677, 247, 272; 248/316.1, 248/316.4–316.6, 316.8, 229.12, 229.14, 248/229.22, 229.24, 228.3; 296/37.6; 190/102
See application file for complete search history.

(56) References Cited

U.S. PATENT DOCUMENTS

| | | | | |
|---|---|---|---|---|
| 5,836,327 | A  * | 11/1998 | Davis | 135/16 |
| 6,390,970 | B1 * | 5/2002 | Muller | 600/25 |
| 6,898,893 | B1 * | 5/2005 | Mukdaprakorn | 43/21.2 |
| 2008/0018063 | A1 * | 1/2008 | Morowat | 280/1.5 |
| 2012/0061431 | A1 * | 3/2012 | Raines | 224/240 |

* cited by examiner

*Primary Examiner* — Justin Larson
*Assistant Examiner* — Phillip Schmidt
(74) *Attorney, Agent, or Firm* — Baker & Hostetler LLP

(57) ABSTRACT

A device for detachably affixing a piece of luggage to a person includes a belt plate that can be affixed to a belt and a shaft that is movably affixed to the belt plate and that has a threaded portion that accommodates a nut. A clamp that includes a bottom clamp element and a top clamp element may secures attach a handle of a piece of luggage to the device, ensuring ease of movement and hands-free operation. The bottom clamp element may be rigidly affixed to the bottom of the shaft or may be adjustable by use of a second nut that may support the bottom clamp element in a particular position. A top clamp element may be configured about the shaft and linearly movable about the shaft, held in place by the first nut to secure a luggage handle in the area between the top clamp element and the bottom clamp element.

19 Claims, 7 Drawing Sheets

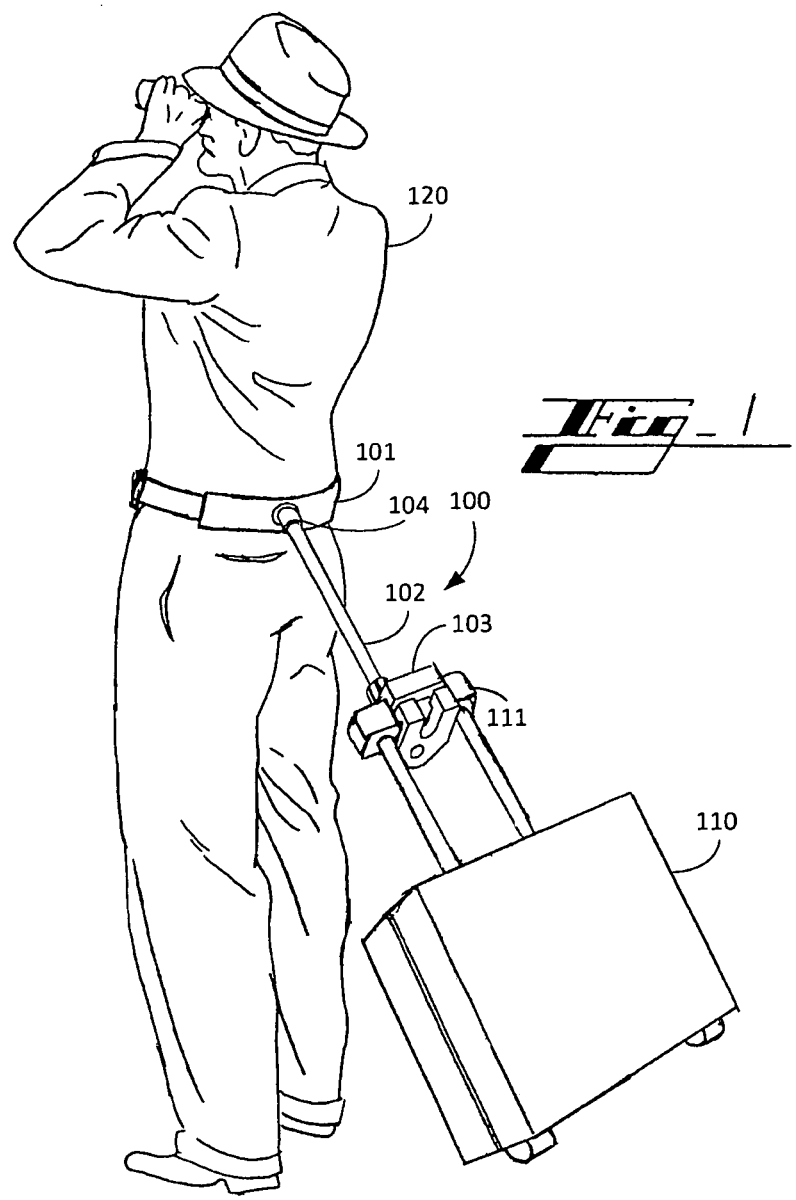

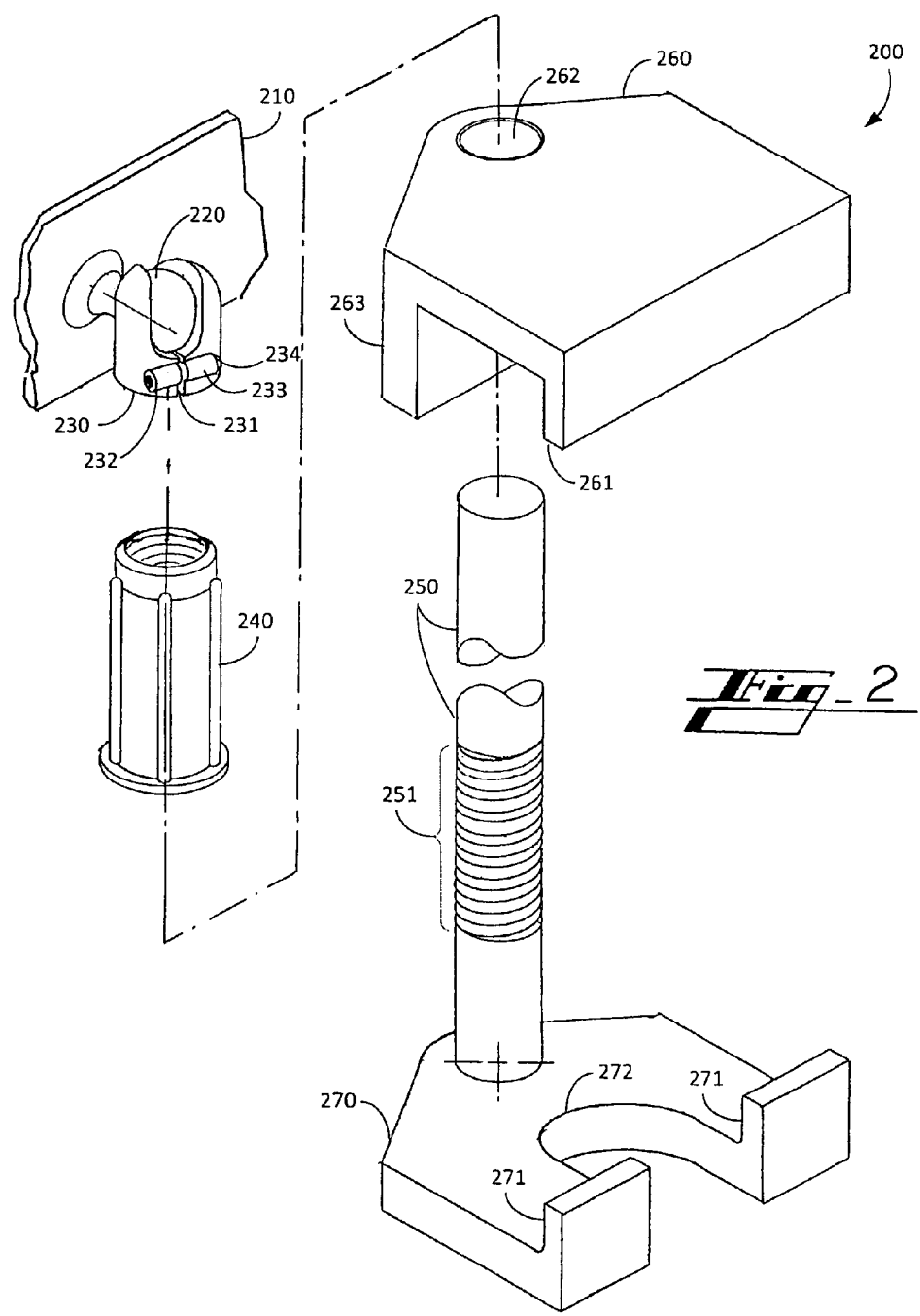

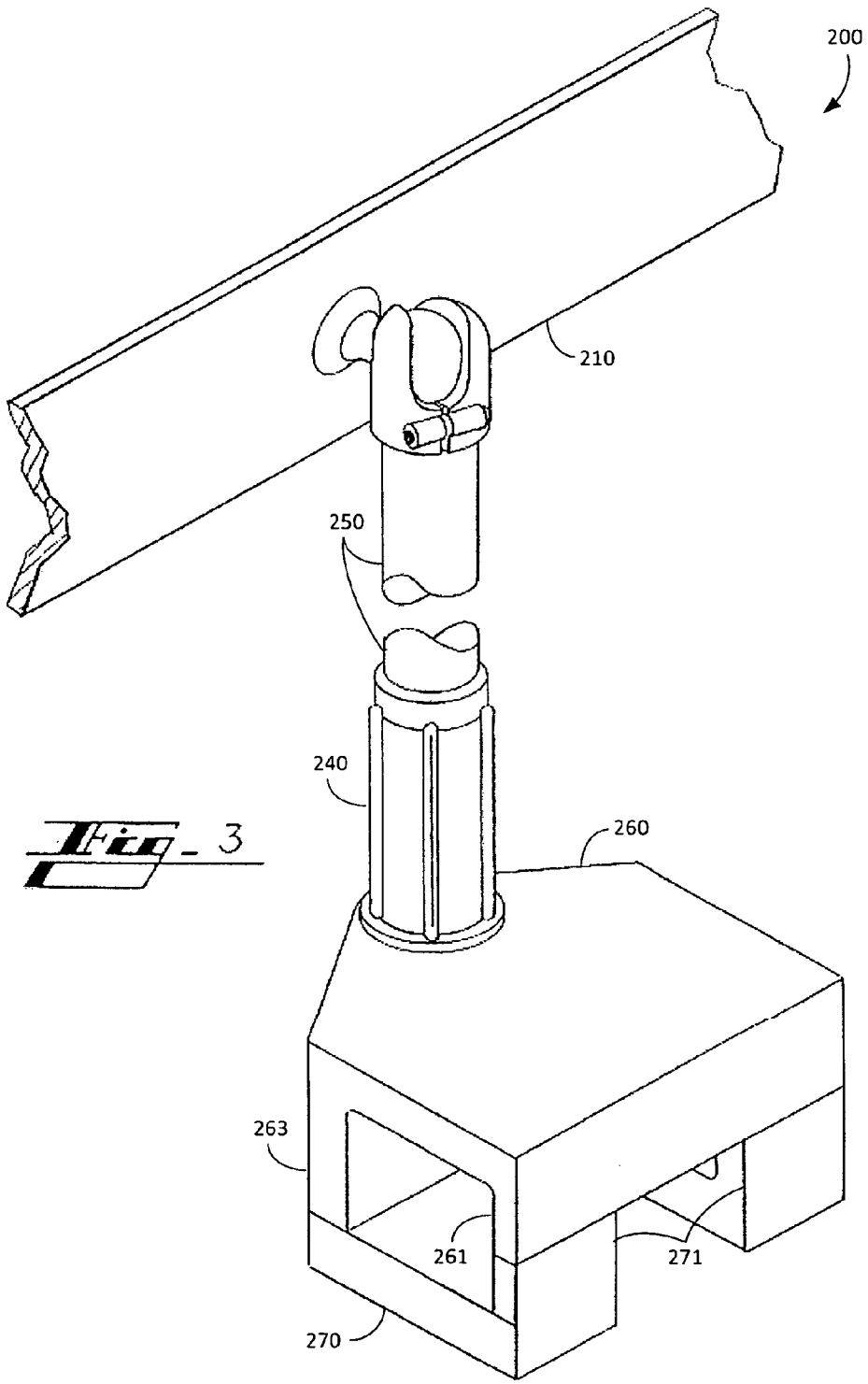

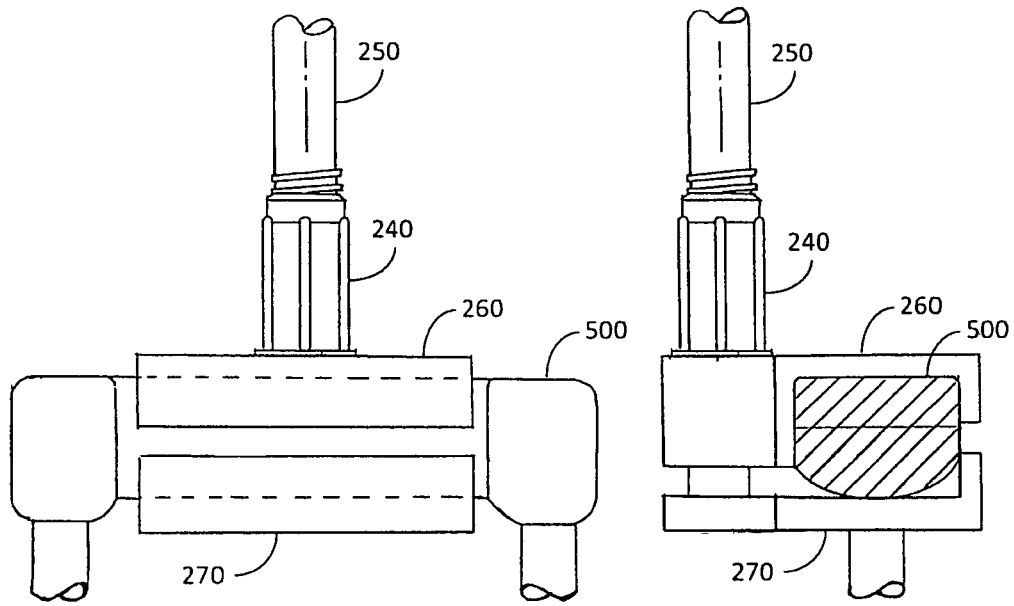
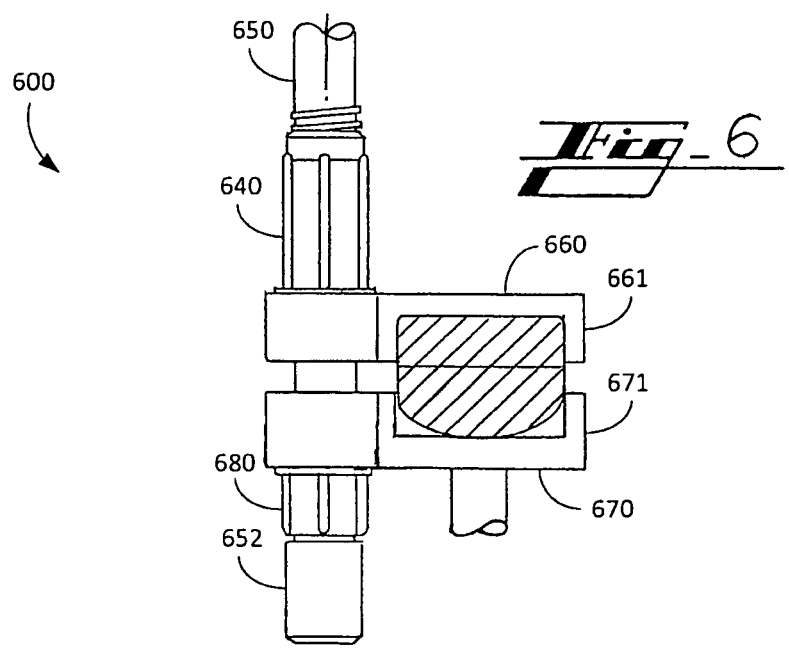

WHEELED LUGGAGE ATTACHMENT DEVICE

CROSS-REFERENCE TO RELATED APPLICATIONS

This application claims priority to U.S. Provisional Patent Application No. 61/665,971, filed Jun. 29, 2012, the disclosure of which is incorporated herein by reference in its entirety.

TECHNICAL FIELD

The technical field generally relates to devices for assisting in moving luggage and more specifically relates to a device adapted to attach wheeled luggage to a user to allow pulling of the luggage without having to use the user's hands.

BACKGROUND

The integration of wheels into luggage, suitcases, and other types of bags commonly used in travel has made such items much easier to transport by individual users. A person can now easily pull a piece of luggage through an airport, parking lot, or any other large area without having to lift the piece of luggage, and therefore the piece of luggage can be moved more easily be moved farther and faster than if the piece of luggage had no wheels. However, in order to move wheeled luggage, a user has to grasp a handle that is typically affixed to such luggage, thereby preventing that user from making use of one of their hands. In the modern travel environment, the amount of time a user may be required to transport his or her luggage has become greater than ever. Heightened security requires earlier arrival at airports and other transportation hubs and has introduced numerous and thorough security checkpoints and other obstacles between a traveler and his or her destination. To overcome such obstacles and increase the comfort of a traveler, the use of both hands, for example, to purchase a snack or retrieve documents required at a security checkpoint, is increasingly important. Thus, what is needed in the art is a device and methods to retain the convenience of using wheeled luggage while allowing a user full mobility and use of both hands.

SUMMARY

A device for detachably affixing a piece of luggage to a person includes a belt plate that can be affixed to a belt and a shaft that is movably affixed to the belt plate and that has a threaded portion that accommodates a nut. A clamp that includes a bottom clamp element and a top clamp element may secures attach a handle of a piece of luggage to the device, ensuring ease of movement and hands-free operation. The bottom clamp element may be rigidly affixed to the bottom of the shaft or may be adjustable by use of a second nut that may support the bottom clamp element in a particular position. A top clamp element may be configured about the shaft and linearly movable about the shaft, held in place by the first nut to secure a luggage handle in the area between the top clamp element and the bottom clamp element. These and other aspects of the present disclosure are set forth in more detail below and in the figures.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings:

FIG. 1 illustrates a non-limiting exemplary embodiment of the present disclosure in use by a user.

FIG. 2 illustrates an expanded view of a non-limiting exemplary embodiment of the present disclosure.

FIG. 3 illustrates a perspective view of a non-limiting exemplary embodiment of the present disclosure.

FIG. 4B illustrates a side view of a non-limiting exemplary embodiment of the present disclosure.

FIG. 5B illustrates a front view of a non-limiting exemplary embodiment of the present disclosure.

FIG. 6 illustrates a side view of a non-limiting exemplary embodiment of the present disclosure.

DETAILED DESCRIPTION OF ILLUSTRATIVE EMBODIMENTS

Figures 4A, 5A:
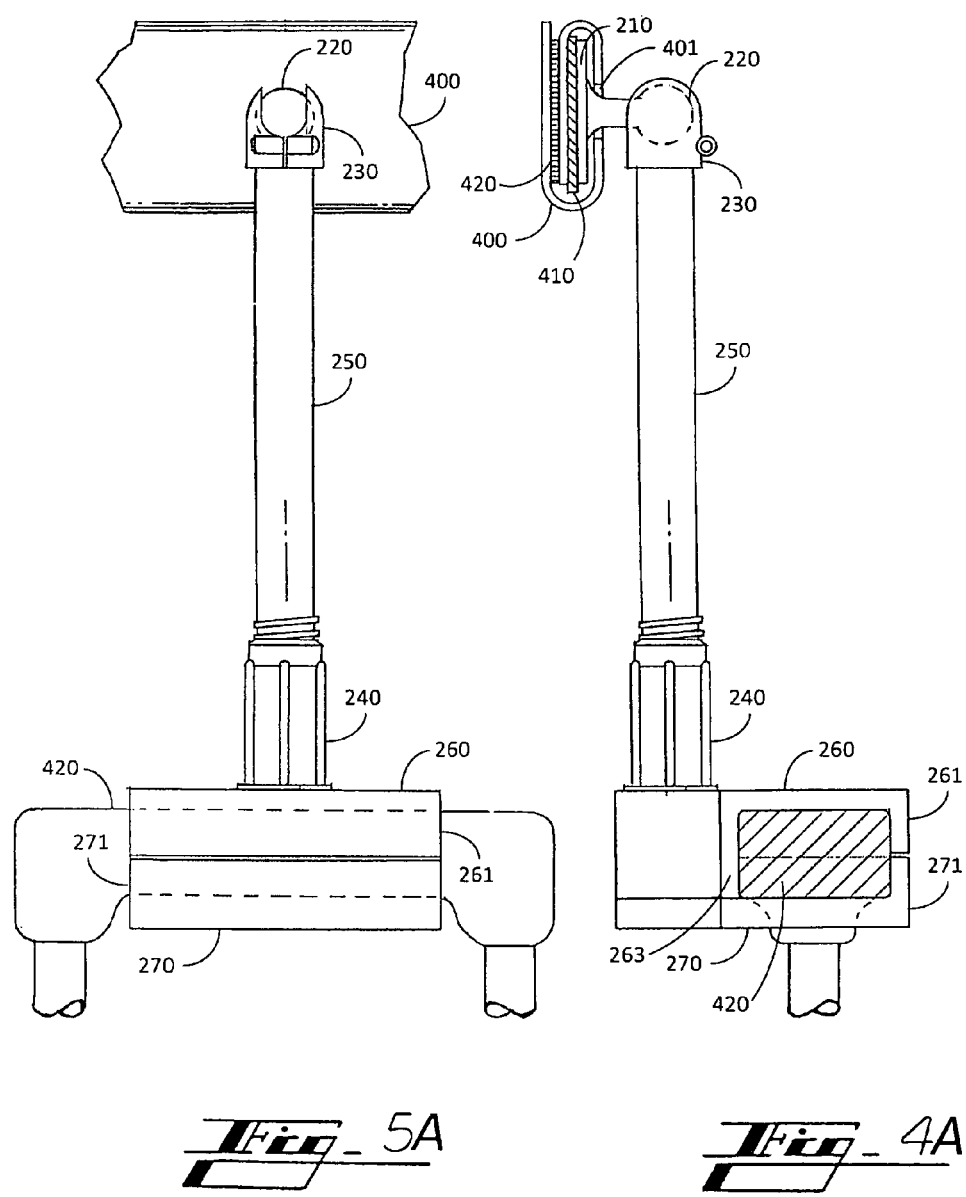
FIG. 4A illustrates a side view of a non-limiting exemplary embodiment of the present disclosure.
FIG. 5A illustrates a front view of a non-limiting exemplary embodiment of the present disclosure.

FIG. 1 illustrates an embodiment of the present disclosure in use by a user and with a piece of luggage. Suitcase 110 may belong to traveler 120, and may be attached to traveler 120 by attachment device 100. In an embodiment, attachment device 100 may be configured with belt 101 that is affixed to shaft 102. Shaft 102 may be configured with clamp 103. Clamp 103 may be removably attached to handle 111 of suitcase 110. Shaft 102 may be affixed to belt 101 at attachment point 104 that may be a ball joint, swivel joint, universal joint, or any other type of joint that allows shaft 102 to swivel or otherwise move in several directions about attachment point 104. Attachment device 100 thereby may allow traveler 120 to easily move about having suitcase 110 attached to traveler 120 via attachment device 100 without requiring the use of either of traveler 110's hands.

FIG. 2 illustrates and expanded view of exemplary attachment device 200 according an embodiment. Belt plate 210 may be a plate designed to be configured inside of a belt, as described in more detail herein. Belt plate 210 may have ball 220 that may be attached to belt plate 210 using any means. Alternatively, ball 220 and belt plate 210 may constructed from a single piece of material. Ball 220 may mate with socket 230 to form a ball joint allowing socket 230 to rotate about ball 220. Socket 230 may be affixed to shaft 250 using any means. In an embodiment, socket 230 may be flexible and may have opening 231 on one side that is straddled by two tubular openings 232 and 233 integrated into socket 230, either or both of which may be internally threaded. Screw 234 may have a thread complementary to that of one or both of tubular openings 232 and 233. Upon insertion of shaft 250 into socket 230, screw 234 may be rotated to draw openings 232 and 233 closer together to form a secure attachment of shaft 250 to socket 230. Alternatively, socket 230 may have opposing opening designed to accommodate two such screws that may be used to secure shaft 250 to socket 230. In addition, or instead, socket 230 may have a ridge or depression that is designed to mate with a counterpart depression or ridge internal to socket 230. Note that any other means of securely attaching shaft 250 to socket 230 may be used and all such embodiments are contemplated as within the scope of the present disclosure. Note also that in some embodiments, the locations of ball 220 and socket 230 may be reversed such that a ball 220 is affixed to shaft 250 and socket 230 is affixed to belt plate 210. This and any other configurations of ball 220 and socket 230 are contemplated as within the scope of the present disclosure.

Bottom clamp element 270 may be rigidly affixed to shaft 250. Alternatively, in some embodiments shaft 250 and bottom clamp element 270 may be constructed from a single piece of material. As bottom clamp element 270 may prevent any of the component of attachment device 200 from falling off or otherwise being removed from shaft 250 by movement over or beyond bottom clamp element 270, assembly of attachment device 200 may performed by placing the components of attachment device 200 about shaft 250 in the order shown in the figures before attaching shaft 250 to socket 230.

In an embodiment, bottom clamp element 270 may have raised lips 271 that may restrain a handle of a piece of luggage when bottom clamp element 270 and top clamp element 260 are applied to such a handle. Bottom clamp element 270 may also have indentation 272 that may allow the use attachment device 200 with a luggage handle that has a central support column (e g., a 'T' shaped handle) as well as with a luggage handle that has two support columns configured on each side of the handle.

Top clamp element 260 may be configured with opening 262 through which shaft 250 may extend. Opening 262 may allow top clamp element 260 to move up and down along a portion or the entirety of the length of shaft 250. In an embodiment, top clamp element 260 may have raised lip 261 that may restrain a handle of a piece of luggage when bottom clamp element 270 and top clamp element 260 are applied to such a handle. Top clamp element 260 may have rear retaining element 263 that may restrain a handle of a piece of luggage opposite of raised lips 261 and 271. Rear retaining element may be configured between opening 262 and raised lip 261 such that it separates the area in which a luggage handle may be placed from shaft 250. In an alternative embodiment, top clamp element 260 may have no rear retaining element, and shaft 250 may serve to restrain a handle of a piece of luggage opposite of raised lips 261 and 271.

Nut 240 may be configured to rotate about shaft 250. Nut 240 may be internally threaded with threads that mate with threads 251 on shaft 250. By rotating about shaft 250 and mating with threads 251, nut 240 may be manipulated by a user to secure top clamp element 260 about a luggage handle placed on or supported by bottom clamp element 270 such that the luggage handle may be grasped between top clamp element 260 and bottom clamp element 270. Nut 240 may be constructed with integrated external ridges running substantially perpendicular to the threading internal to nut 240 so that nut 240 may be easily manipulated by hand, allowing a user to easily and quickly rotate nut 240 about shaft 250. By manipulating nut 240 to place downward pressure on top clamp element 260 and reduce the space between top clamp element 260 and bottom clamp element 270, a user may easily cause top clamp element 260 to press against or otherwise restrain a luggage handle placed between top clamp element 260 and bottom clamp element 270 to secure luggage handle. Likewise, when the user no longer needs the attachment device, the user may easily manipulate nut 240 to relieve downward pressure on top clamp element 260, allowing the space between top clamp element 260 and bottom clamp element 270 to increase so that the luggage handle can be removed from the attachment device.

FIG. 3 illustrates an embodiment where top clamp element 260 and bottom clamp element 270 are proximate illustrating how various sections of these elements may form an area that securely restrains a luggage handle. As can be seen in this figure, rear retaining element 263 of top clamp element 260 and raised lips 261 and 271 of the clamp elements provide horizontal restraint for a luggage handle, while top clamp element 260 and bottom clamp element 270 provide vertical restraint. Note that there is no requirement for any portion of top clamp element 260 to mate with or otherwise meet any portion of bottom clamp element 270 in order for any embodiment of this disclosure to function effectively. Nut 240 merely has to be manipulated such that top clamp element 260 in conjunction with bottom clamp element 270 may restrain a luggage handle. This allows the present embodiments to be used with luggage handles of widely varying sizes and shapes.

FIG. 3 also illustrates belt plate 210 in more detail. Belt plate 210 may be thin, flexible, and/or shaped such that it may be placed into a belt, affixed to a belt, or into a belt wrap, as shown in FIGS. 4A and 5A. Alternatively belt plate 210 itself may be a belt or may be constructed with a belt. As can be seen in FIG. 4A, belt wrap 400 may be used to restrain both belt plate 210, thereby restraining attachment device 200, and belt 410 that a user may then affix about the user's body, as shown in FIG. 1. Belt wrap 400 may be of any size and shape sufficient to perform this function and may attach to itself using any means. In an embodiment, belt wrap 400 may have fabric hook-and-loop fastener material (e.g., VELCRO®) 420 in sections such that when wrapped around belt 410 and belt plate 210, the fabric hook-and-loop fastener sections meet and can be affixed to one another. As seen in FIG. 4A, belt wrap 400 may also have opening 401 that allows ball 220 to extend through belt wrap 400, securely containing belt plate 210 within belt wrap 400 while allowing shaft 250 via socket 230 to connect to ball 220. In an embodiment, belt wrap 400 also provides area for creative expression. For example, a name, logo, expression, trademark, identifying information, artistic design, and/or any other expressive visual content may be integrated into the portion of belt wrap 400 that is visible when a user is using attachment device 200. Alternative means of securing belt plate 210 to a belt are contemplated, including sewing belt plate 210 into a belt wrap, sewing belt plate 210 directly to a belt, and constructing a belt that integrates a connection means such as ball 220.

Also shown in more detail in FIGS. 4A and 5A is the attachment of luggage handle 420 to attachment device 200 by top clamp element 260 in conjunction with bottom clamp element 270. As seen in these figures, the clamp elements may be placed into a position such that they secure luggage handle 420 within the area between the clamp elements. Rear retaining element 263 of top clamp element 260 and raised lips 261 and 271 of the clamp elements provide horizontal restraint for a luggage handle, while top clamp element 260 and bottom clamp element 270 provide vertical restraint. Top clamp element 260 may be held in place by nut 240, ensuring that luggage handle 420 is fully restrained within the clamp elements.

Note that while luggage handle 420 shown in FIGS. 4A and 5A includes two support columns configured on each side of the handle, in an embodiment bottom clamp element 270 may also have indentation 272 shown in FIG. 2 that may allow the use of the attachment device 200 with a luggage handle that has a central support column (e g., a 'T' shaped handle) handle. Note also that other types of luggage handles may be used with presently disclosed embodiments, such as those with a single support column configured on one end of a handle. Due to the adjustability provided by movable top clamp element 260 and nut 240, any size, shape, and type of luggage handle may be used with embodiments set forth herein.

As mentioned above, there is no requirement for any portion of top clamp element 260 to mate with or otherwise meet any portion of bottom clamp element 270 in order for any embodiment of this disclosure to function effectively. As shown in FIGS. 4B and 5B, nut 240 may be manipulated such that top clamp element 260 in conjunction with bottom clamp element 270 may restrain luggage handle 500 without causing the mating of top clamp element 260 and bottom clamp element 270. This allows the present embodiments to be used with luggage handles of widely varying sizes and shapes.

In another embodiment, shown in FIG. 6, both clamp elements may be adjustable and secured by nuts. While the following describes this aspect of attachment device 600, note that this portion of attachment device 600 and any other portion of attachment device may be configured in various ways, including according to any embodiment disclosed herein, without departing from the contemplated scope of the present disclosure. Attachment device 600 may include top clamp element 660 that may be configured with an opening, in an embodiment similar to opening 262 shown in FIG. 2, through which shaft 650 may extend. This opening may allow top clamp element 660 to move up and down along a portion or the entirety of the length of shaft 650. In an embodiment, top clamp element 660 may have raised lip 661 that may restrain a handle of a piece of luggage when bottom clamp element 670 and top clamp element 660 are applied to such a handle. Similar, bottom clamp element 670 may be configured with an opening similar to opening 262 shown in FIG. 2 through which shaft 650 may extend. This opening may allow bottom clamp element 670 to move up and down along a portion or the entirety of the length of shaft 650. In an embodiment, bottom clamp element 670 may have raised lip 671 that may restrain a handle of a piece of luggage when the clamp elements are applied to such a handle. Bottom clamp element 670 may also have an indentation similar to indentation 272 of FIG. 2 that may allow the use of the attachment device 600 with a luggage handle that has a central support column (e.g., a 'T' shaped handle) handle.

As shown in FIG. 6, shaft 650 may be threaded to allow both internally threaded nuts 640 and 680 to be manipulated about the threaded portion of shaft 650. Note that shaft 650 may be threaded in one portion to accommodate both nuts, or in two portions with one portion to accommodate each nut. Nut 680 may be prevented from removal from shaft 650 by portion 652 of shaft 650 that may be larger than the internal diameter of nut 680. As section 652 may prevent any of the component of attachment device 600 from falling off or otherwise being removed from shaft 650 by movement over section 652, assembly of attachment device 600 may performed by placing the components of attachment device 600 about shaft 650 in the correct order before attaching shaft 650 to socket 630.

By allowing a user to position both clamp elements at various points along shaft 650, a user may adjust the point at which a luggage handle is affixed to attachment device 600. In this way, a user may adjust the device for comfort and convenience. For example, a taller user may want the attached piece of luggage to be a greater distance from the user's legs to ensure that the user's feet do not hit the piece of luggage when walking. Alternatively, a user may desire that the attached piece of luggage is closer for easier access to the piece of luggage. With this embodiment, this is readily accomplished by adjusting the location of the clamp elements along shaft 650 by adjusting nut 680.

Figure 7:
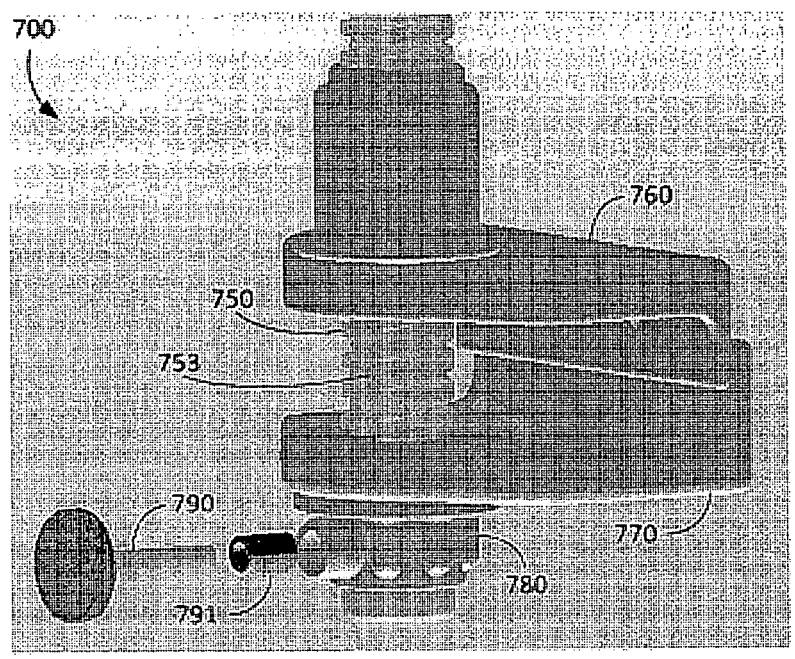
FIG. 7 illustrates a perspective view of a non-limiting exemplary embodiment of the present disclosure.

FIG. 7 illustrates another alternative embodiment similar to that shown in FIG. 6 where shaft 750 of attachment device 700 includes an indentation that may be configured to receive screw 780 through an opening in nut 780 so that nut 780 may be secured to shaft 750 in a durable fashion. Such an embodiment may be useful when a shaft such as shaft 750 does not include an expanded portion such as portion 652 of shaft 650 in FIG. 6 that restrains components of an attachment device. As a user is likely to determine a comfortable location for clamp elements 760 and 770 along shaft 750 far fewer times than a user is likely to insert a luggage handle between the clamp elements, and because bottom clamp element 770 will bear most of the weight of luggage being pulled using attachment device 700, it may be desirable to more securely affix bottom clamp element 770 using screw 780 to shaft 750. Note that a jacket or insert 791 may be used to increase the durability of screw 790 and/or nut 780 as screw 790 is inserted and removed from attachment device 700.

Figure 8:
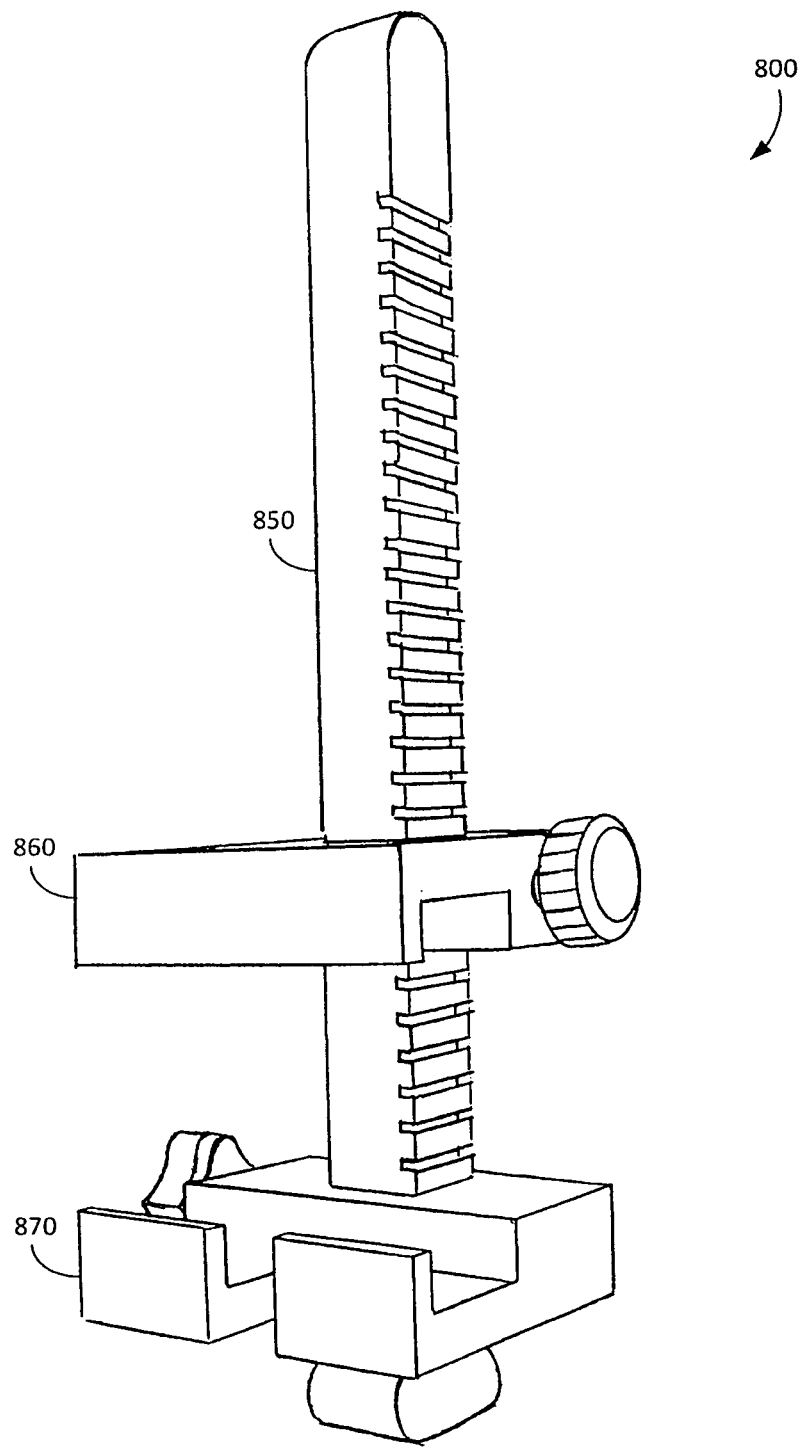
FIG. 8 illustrates a perspective view of a non-limiting exemplary embodiment of the present disclosure.

It is contemplated that embodiments may be constructed that vary from the embodiments specifically described herein and shown in the figures, and all such embodiments are contemplated as within the scope of the present disclosure. For example, as shown in FIG. 8, attachment device 800 may have shaft 850 that may be rectangular in linear shape rather than cylindrical and may use alternate attachment means for clamp elements, such as notches that received screws, clips, pins, or any other restraining means. Clamp elements 860 and 870 may jointly form a rear retaining element, or may form no rear retaining element, allowing shaft 850 to serve that function. It is also contemplated that clamp elements may be any shape and size, and may be restrained along an attachment device shaft using any means. In another embodiment, only a bottom clamp element may be movable along a shaft and a top clamp element may be non-movably affixed to a shaft of an attachment device. Each component of an attachment device as contemplated may be constructed of any material or combination of material, and of more or fewer parts than described herein without departing from the scope and spirit of the present disclosure.

While the disclosed wheeled luggage attachment devices have been described in connection with the various embodiments of the various figures, it is to be understood that other similar embodiments may be used or modifications and additions may be made to the described embodiments to construct a device that performs the functions described with regard to the disclosed embodiments without deviating therefrom. For example, one skilled in the art will recognize the devices described in the present application may be constructed of any material or any combination of materials and any of the individual components of the described wheeled luggage attachment devices disclosed may be combined into single components or constructed of more than one component. Therefore, wheeled luggage attachment devices as described herein should not be limited to any single embodiment, but rather should be construed in breadth and scope in accordance with the appended claims.

What is claimed is:

1. A device for detachably affixing a piece of luggage to a person, comprising:
   a belt plate;
   a shaft movably affixed to the belt plate, the shaft comprising a threaded portion;
   a bottom clamp element rigidly affixed to a bottom of the shaft, wherein the bottom clamp element comprises an indentation configured to receive a central support column perpendicularly affixed to a luggage handle, the indention opening in a direction opposite the bottom of the shaft;

a top clamp element configured about the shaft, wherein the top clamp portion is linearly movable about the shaft; and a nut configured about the shaft at the threaded portion of the shaft, wherein the nut is rotatable about the threaded portion of the shaft to drive the top clamp portion towards the bottom clamp portion.

2. The device of claim 1, wherein the belt plate is configured to be removably attached to a belt.

3. The device of claim 1, wherein the indentation is substantially U-shaped.

4. The device of claim 1, wherein the shaft is movably affixed to the belt plate with a ball and socket joint.

5. The device of claim 4, wherein a ball of the ball and socket joint is affixed to the belt plate and a socket of the ball and socket joint is affixed to the shaft.

6. The device of claim 5, wherein the socket is secured about the ball with a screw.

7. The device of claim 1, further comprising a belt wrap configured to receive the belt plate.

8. The device of claim 7, wherein the belt wrap is further configured to receive a belt.

9. The device of claim 8, wherein the belt wrap comprises hook-and-loop fastener material that secures the belt wrap about the belt plate and the belt.

10. A device for detachably affixing a piece of luggage to a person, comprising:
   a belt plate;
   a shaft movably affixed to the belt plate, the shaft comprising a threaded portion;
   a top clamp element configured about the shaft, wherein the top clamp portion is linearly movable about the shaft;
   a bottom clamp element configured about the shaft, wherein the bottom clamp portion is linearly movable about the shaft;
   a first nut configured about the shaft at the threaded portion of the shaft, wherein the first nut is rotatable about the threaded portion of the shaft to drive the top clamp portion towards the bottom clamp portion; and
   a second nut configured about the shaft at the threaded portion of the shaft, wherein the second nut is rotatable about the threaded portion of the shaft to drive the bottom clamp portion towards the top clamp portion.

11. The device of claim 10, wherein the belt plate is configured to be removably attached to a belt.

12. The device of claim 10, wherein the bottom claim element comprises an indentation configured to receive a luggage handle shaft.

13. The device of claim 10, wherein at least one of the top clamp element and the bottom clamp element comprises a raised lip configured to restrain a luggage handle.

14. The device of claim 10, wherein the shaft is movably affixed to the belt plate with a ball and socket joint.

15. The device of claim 14, wherein a ball of the ball and socket joint is affixed to the belt plate and a socket of the ball and socket joint is affixed to the shaft.

16. The device of claim 15, wherein the socket is secured about the ball with a screw.

17. The device of claim 10, further comprising a belt wrap configured to receive the belt plate.

18. The device of claim 17, wherein the belt wrap is further configured to receive a belt.

19. The device of claim 18, wherein the belt wrap comprises hook-and-loop fastener material that secures the belt wrap about the belt plate and the belt.

* * * * *